Nov. 22, 1932.    F. JOHNSON    1,888,728
TRANSMISSION
Filed March 16, 1931
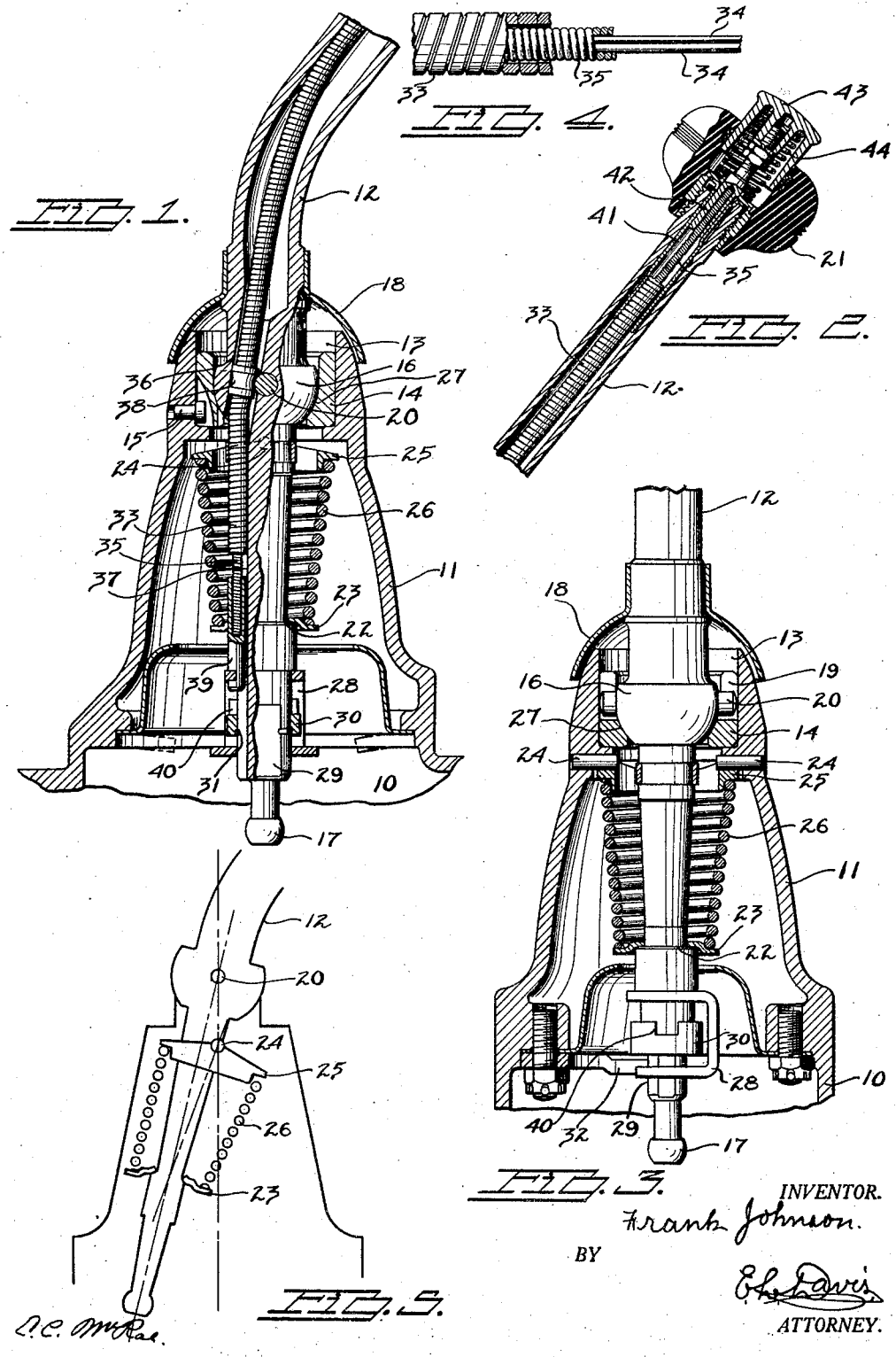
INVENTOR.
Frank Johnson.
BY
ATTORNEY.

Patented Nov. 22, 1932

1,888,728

UNITED STATES PATENT OFFICE

FRANK JOHNSON, OF DETROIT, MICHIGAN, ASSIGNOR TO FORD MOTOR COMPANY, OF DEARBORN, MICHIGAN, A CORPORATION OF DELAWARE

TRANSMISSION

Application filed March 16, 1931. Serial No. 522,876.

The object of my invention is to provide a transmission having a novel type of gear shifting mechanism which mechanism will be easy to operate, positive in its action, and will overcome many of the difficulties inherent in the conventional types of shifting mechanisms. More particularly, my invention consists of a structure wherein a shift lever retaining spring is mounted within the transmission housing in position to urge the shift lever pivot into engagement with its spherical seat thereby maintaining an oil seal at this point, and further to resiliently retain the lever in any of its several operating positions thereby preventing accidental disengagement of the gear shift lever.

In the ordinary transmission it has been common practice to pivotally mount the gear shifting lever on the top of the transmission, the lower end of the lever projecting into the housing to selectively operate or shift the various sliding gears therein to effect the desired speed ratio. Inasmuch as at least four operating positions are required in automobile transmissions the H type shift has been universally used, from which it will readily be seen that a universal mounting for the shift lever is essential. A ball and spherical seat has proven itself to be the most satisfactory type of joint for use at this point and it is therefore incorporated in my improved device. In order that an oil type seal may be maintained between the shifter lever ball and seat, a spring is usually provided which coacts with the housing and the end of the lever to resiliently urge the ball into its seat. However, when this construction is used the natural tendency of this spring is to prevent distortion or bending of itself so that the axially shifting of one end of the spring, due to the movement of the gear shift lever, is resisted by the inherent resistance of the spring.

With my improved device the shifter spring is allowed to pivot or roll on a suitable fulcrum line in a fore and aft direction, thereby compensating for the fore and aft movement of the opposite end of the spring. Thus, there is no distortion of the spring due to the shifting of the lever and, therefore, the movement of the lever is not retarded by the resistance of the spring. In fact, my fulcrum is so disposed, as will hereinafter be brought out, that the shift lever is resiliently retained by the shifter spring in its several operative positions.

My device is particularly suitable for use in shifting four speed transmissions or transmissions of the free-wheeling type wherein the extra speed is obtained by shifting through one of the other speed positions. It will readily be seen that with the ordinary type of shift lever and spring the distortion of the shifter spring when in this extra position would be exceedingly great so that the shift lever would tend to be thrown out of position by the shifter spring alone, unless some other device was provided for holding the lever in this position. Spring actuated plungers are usually provided for this purpose, however, when the shift lever is moved through the large angle required by these extra speed positions, the spring plungers must be excessively heavy in order to counteract the action of the shift lever spring. These heavy plungers require an appreciable pressure on the shift lever for operation thereof, and it is the overcoming of these requirements, and the provision of an easily operated lever, which is the most important feature of this invention.

Still a further object of my invention is to provide a shift lever especially adapted for actuating the extra speed catch or dog required in transmissions wherein the fourth speed is obtained by shifting the lever through one of the other speeds. In such transmissions it is ordinary practice to provide a dog in the inner end of the gear shift lever which will normally coact with a stop in the housing so that the lever cannot be accidentally shifted through its third position. When it is desired to utilize the fourth position, the dog is raised or lowered, so that it will not coact with the fixed stop in the housing, thereby allowing the shift lever to operate through its full range or to the fourth position.

Various rods, levers, shafts, etc. have been provided for this purpose, which devices generally extend down along one side of the shift lever and are operated by an extra handle similar to a ratchet-type brake lever construction. Such devices have the disadvantage of being hard to operate in most installations. This is especially true where the shift lever is required to be bent rearwardly as is commonly done in most up-to-date automobiles.

Still further it frequently happens that shift levers are bent while in service, either to suit the particular position for the shifter knob as desired by the particular driver, or more often, the lever is bent through the application of excessive force on the operating knob. With the older type of construction such bending caused the dog operating device to bind so as to be inoperative or even changed the effective length of the device so that the positions of the dog were altered. Such change in position of course rendered the dog inoperative. My improved device may be bent either intentionally or inadvertently through a large angle without altering in the slightest particular the actuation of the dog operating device.

I have provided a tubular shift lever which has a flexible cable extending therethrough, the upper end of which is connected to a push button in the shifter knob while the lower end is connected to the dog reciprocally mounted on a lower end of the lever whereby actuation of the push button moves the dog out of engagement with the stop in the housing. This cable being flexible may be threaded through the bend in the lever and will operate in a satisfactory manner without attention during the full life of the device, while being entirely enclosed to present a neat appearance. It may be well to mention here that no claim is made to the particular cable, per se, inasmuch as any one of several of such flexible cables now on the market may be used with entire satisfaction.

With these and other objects in view, my invention consists in the arrangement, construction, and combination of the various parts of my improved device, as described in this specification, claimed in my claims, and illustrated in the accompanying drawing, in which:

Figure 1 shows a vertical, central, sectional view through the lower portion of my improved gear shift lever.

Figure 2 shows a central sectional view through the upper end of the lever, shown in Figure 1.

Figure 3 shows a vertical central sectional view, taken at right angles to the view, shown in Figure 1.

Figure 4 shows an enlarged view of a portion of my dog-operating cable, and

Figure 5 shows a diagrammatic view illustrating the action of my shifter retaining spring.

Referring to the accompanying drawing, I have used the reference numeral 10 to indicate a transmission cover which is formed integrally with an upwardly extending inverted bell-shaped housing 11, the upper end of which pivotally receives my gear shift lever. The gear shift lever, which I have designated generally by numeral 12, is mounted in position so that its upper end can be conveniently operated by the driver to selectively shift the various shifter forks in the transmission. The upper end of the housing 11 is provided with an annular bore 13 in which a sleeve 14 is fitted, and this sleeve is provided with a spherical seat 27 therein to universally mount the shifter lever. A pin 15 extends from the housing 11 into a suitable groove in the sleeve to prevent rotation of the latter in the bore 11.

The purpose of providing a separate sleeve 14 is because the housing 11 is generally cast from aluminum or one of its alloys, while the sleeve 14 is formed from steel to thereby make a permanent spherical joint for the shift lever pivot. Still further, by this construction an oil tight joint can readily be produced for the reason that only the sleeve member 14 need be slotted to prevent rotation of the shifter lever, whereas if the integral construction is used, it is necessary to provide a slot through the housing for this purpose, which slot invariably allows oil to leak out of the ball joint.

The lower end of the shift lever 12 extends down through the sleeve 14 and is provided with an integral spherical ball 16 formed thereon which is machined to fit in the seat 27. The lower end of the shifter lever terminates with a ball end 17 which is in position to coact with the transmission shifter forks to thereby selectively shift the various gears in the transmission. A semi-spherical dust cap 18 is secured to the shifter lever just above the ball 16, which cap forms a closure for the bore 13 and although no positive seat is provided between this cap and the housing, still dust, water and the like are kept out of the sleeve 14 by this construction, besides forming a neat appearance for the structure.

Due to the necessity of the upper end of the gear shift lever being placed in a convenient position for the driver to operate, the shift lever is bent rearwardly just above the ball 16 so that its upper end projects diagonally and rearwardly from the ball joint. When such construction is used, means must be provided to prevent rotation of the lever in the spherical joint so that lateral and forward motions of the upper end of the lever will cause the lower end of the lever to move in opposite directions and not be counteracted by rotation of the shift lever. In order to prevent such rotation I have provided a diametrical slot 19 which extends through the upper half of the sleeve 14 into which a pin 20 extends, this pin extending through the center of the spherical ball 16 into which it is anchored. Thus, the shift lever is prevented from rotation but is still allowed lengthwise and lateral oscillation for the desired shifting of the lever. The upper end of the lever 12 is provided with a knob 21 threaded thereon which is usually formed from bakelite, hard rubber or some similar substance whereby the lever may be conveniently manually shifted.

It has been customary with such gear shift levers to provide a compression spring extending around the lever between the housing and the lower end thereof, to thereby resiliently urge the spherical ball into its seat, thereby preventing oil leakage from the transmission. Such construction is satisfactory where only a small angular movement of the shifter lever is required. In those transmissions requiring a larger angular movement, the axial distortion of the lower end of the retaining spring becomes so great that excessive force must be applied to the lever to overcome the resistance of the spring and further excessively strong spring operated plungers or similar devices must be employed to prevent the accidental disengagement of the shift lever from its selected position when the car is being used. The shift lever mounting shown herein is particularly adapted for use in those transmissions wherein large movement of the shifter lever is required, especially those installations wherein an extra position of the lever is obtained by shifting through one of the standard positions.

This arrangement is usually incorporated in free-wheeling transmissions wherein a positive second speed drive is obtained by shifting through the overrunning second speed position. It will readily be seen that when shifting through one of the normal positions a much greater angular movement of the shift lever is required than in the standard shift.

In the structure shown, means are provided wherein the shift lever retaining spring, although inoperative for this purpose in neutral position, resiliently holds the lever in any of its selected positions. A shoulder 22 is formed on the lever intermediate of the ball 17 and pivot ball 16 upon which a U-shaped washer 23, similar to a valve spring retaining washer, is mounted and which in like manner serves to retain my shift lever spring. I have provided a pair of diametrically opposed pins 24 extending inwardly from opposite sides of the housing 11 just below the sleeve member 14, the lower half of the inner portions of which are exposed and form knife edge fulcrums on each side of the shift lever upon which a rocking washer 25 may pivot. The washer 25 is provided with a relatively large opening therein so that considerable clearance is obtained between the shift lever and the washer. It will be noted from the drawing that the upper face of the washer is bevelled to allow a limited rocking movement on the pins 24 and that the pivot points on the washer are grooved to receive the lower half of these pins thereby preventing lateral displacement of the washer. A compression spring 26 is interposed between the washers 23 and 25 to thereby constantly urge the spherical ball 16 into the seat 27, which also retains the sleeve 14 in the housing 11.

It will be noted from Figures 1 and 5 that when the lever is in its neutral position, as shown in Figure 1, the sole function of the spring 26 is to maintain an oil tight joint between the spherical ball and seat. However, when the lever is moved to one of its shifted positions, as shown in Figure 5, then the spring 26 will resiliently hold this lever in such position for the reason that the total distance from the washer 23 to the center of the ball 16 by way of the pivot pins 24 is greater than the direct distance from the washer to the center of the ball.

It will thus be seen that shifting the lever back to neutral position will require a slight compression of the spring 26, which compression, of course, tends to retain the lever in its shifted position. This action is obtained in all of the shifted positions on either side of its neutral position so that spring operated plungers and the like, which are usually provided in conjunction with the shifter fork interlocking mechanisms, while they may be included as a matter of precaution, still are only necessary for locating the shifter gear shafts and may, therefore, be of very light construction. The manual force required to counteract the action of such small plungers, if included, is very small to thereby obtain a very easily operated device.

As has been stated, my shift lever is particularly adapted for use in connection with four speed or free-wheeling transmission, in which case it is usually essential to provide a manually operable stop which can be disengaged when it is desired to shift into the extra position. A U-shaped member 28 bent from flat stock is reciprocally mounted on the lower end of the shift lever 12, the shift lever extending through suitable openings in the arms of this member. The lever is flatted at 29 and the U member is provided with a correspondingly shaped opening so that the member is non-rotatably mounted on the lever. In order that this member may not become accidentally released from the end of the lever, I have provided a sleeve 30 around the lever between the arms of the member, which sleeve is held in position by a resilient retaining ring 31 so that when this sleeve is in place only a limited reciprocation of the member 28 will be permitted. A suitable stop plate 32 is bolted to the housing 11 in a plane with the lower arm of the member 28, when in its upper position, so that when the gear shift lever is shifted to the normal overrunning second speed position, this arm will strike against the lug 32 thereby preventing further shifting of the lever. However, when the member is pushed downwardly the stop 32 allows the lever to pass through this overrunning second speed position into a positive second speed position.

Although this stop mechanism is not believed to be new in itself, I have provided what is believed to be a novel means for operating this mechanism. The shifting lever 12 is generally a tubular section, that is, the tube portion extends from the ball 16 upwardly through the upper end thereof. I have provided a flexible cable which extends from the knob 21 down through the tubular lever 12 and projects out from the side of the lever just below the ball 16 from where it follows the lever down to the member 28. This cable consists generally of a closely wound spring which forms a flexible outer tube 33 into which a second cable is reciprocably mounted. This second cable consists of one or more lengths of relatively small piano wire 34 around which is wrapped a closely wound spring 35, the spring and enclosed wires being securely fastened together at their ends. It will readily be seen that compression of this second cable is resisted by the closely wound spring 35 while tension thereon is resisted by the enclosed wires 34. Although a single larger wire could be used in place of this second cable, still the device shown is more flexible and therefore more easily operable. Other types of cables may be provided if desired, as the particular structure shown is only one of several flexible cables now in general use. However, the particular method of mounting my device in the gear shift lever is believed to be new and is the subject of claims in this application.

The lower end of the tube 33 extends down through an opening 36 drilled through the ball 16 from where it follows in a groove 37 to the lower end of the shift lever. A ferrule 38 is secured around the tube 33 adjacent to the center of the ball 16, which ferrule is provided with an annular groove therein so that the pin 20, projecting through the ball, may also extend through this groove to prevent longitudinal movement of the tube. A sleeve 39 is fastened to the lower end of the cable spring 35, which sleeve is provided with a notch in its lower portion into which the upper arm of the member 28 projects so that reciprocation of the sleeve 39 will also reciprocate the member within the limits allowed by the sleeve 30. In order that the sleeve 30 may not form a positive stop against the member 28, this sleeve is notched at 40 to allow clearance for the lower end of the sleeve 39.

The upper end of the tube 33 is secured in a sleeve 41 which is anchored in the shift lever 12, while the upper end of the cable 35 is fixedly secured in a terminal screw 42 which is reciprocally mounted in the sleeve 41. The upper end of the screw 42 is threaded to receive a button 43 and a compression spring 44, interposed between the top of the lever 12 and button 43, resiliently urges the button to its upward position at all times. When the device is in its normal position the button 43 is urged to its upward position thereby drawing the member 28 upwardly by means of the cable 35 so that the shift lever when moved to its second overrunning speed position is restricted from further movement by the stop 32. However, when the button 43 is depressed it pushes the member 28 downwardly thereby allowing the lever to be shifted into the extra position.

Among the many advantages arising from the use of my improved device, it may be well to mention that with this type of cable actuating mechanism all the parts are enclosed except the operating button and a positively and easy operating device is assured. This device may readily be installed in shifter levers having considerable bend therein which ordinarily are difficult to provide with the type of mechanism formerly supplied.

Still another advantage results from the use of my novel shift lever retaining spring mounting whereby the shift lever is resiliently urged into each of its shifted positions so that easy operation of the shift lever is assured.

Some changes may be made in the arrangement, construction and combination of the various parts of my improved device without departing from the spirit of my invention, and it is my intention to cover by my claims such changes as may reasonably be included within the scope thereof.

I claim as my invention:

1. In a transmission, a housing having a shift lever universally mounted therein, a washer disposed around said lever so as to be permitted a limited rocking movement upon the housing, a second washer disposed around one end of said lever, and a spring interposed between said washers whereby the shift lever is resiliently urged into its mounting and the distortion of said spring due to shifting the lever is minimized.

2. In a transmission, a housing having a shift lever universally mounted therein one end of which projects into said housing, a pair of diametrically opposed pins projecting through said housing, a washer pivotally mounted on said pins so as to be permitted a limited rocking movement, and a spring interposed between the enclosed end of said lever and said washer to thereby resiliently urge the shift lever into its mounting and minimize the distortion of said spring due to the shifting of the lever.

3. In a transmission, a housing, a shift lever having a ball on its intermediate portion upon which it is mounted in said housing, a pair of diametrically opposed pins projecting from said housing to position adjacent to the under side of said ball, a washer pivotally mounted on said pins so as to be permitted a limited rocking movement, and a spring interposed between the inner end of said lever and said washer for the purpose described.

4. In a transmission, a shift lever having a ball formed on its intermediate portion upon which it is universally mounted in said housing, a pair of diametrically opposed pins projecting through said housing to position adjacent to the lower portion of said ball, a washer pivotally mounted on said pins so as to be permitted the limited rocking movement, a second washer disposed around the enclosed end of said lever, and a spring interposed between said washers thereby resiliently urging said ball into its mounting and minimizing the distortion of said spring due to the shifting of the lever.

March 4, 1931.

FRANK JOHNSON.